(12) United States Patent
Mohtar et al.

(10) Patent No.: US 10,544,808 B2
(45) Date of Patent: Jan. 28, 2020

(54) TURBOCHARGER COMPRESSOR HAVING ADJUSTABLE TRIM MECHANISM INCLUDING VORTEX REDUCERS

(71) Applicant: Honeywell International Inc., Morris Plains, NJ (US)

(72) Inventors: Hani Mohtar, Chaumousey (FR); Stephane Pees, Ceintrey (FR); Stephane Doise, Epinal (FR); Alain Lombard, Vosges (FR)

(73) Assignee: Garrett Transportation I Inc., Torrance, CA (US)

( * ) Notice: Subject to any disclaimer, the term of this patent is extended or adjusted under 35 U.S.C. 154(b) by 143 days.

(21) Appl. No.: 15/907,420

(22) Filed: Feb. 28, 2018

(65) Prior Publication Data

US 2019/0264710 A1    Aug. 29, 2019

(51) Int. Cl.
| | |
|---|---|
| F04D 29/66 | (2006.01) |
| F02B 37/24 | (2006.01) |
| F04D 29/46 | (2006.01) |
| F16K 3/03 | (2006.01) |
| F04D 15/00 | (2006.01) |

(52) U.S. Cl.
CPC ........... *F04D 29/667* (2013.01); *F02B 37/24* (2013.01); *F04D 15/0022* (2013.01); *F04D 29/462* (2013.01); *F16K 3/03* (2013.01)

(58) Field of Classification Search
None
See application file for complete search history.

(56) References Cited

U.S. PATENT DOCUMENTS

| | | | | |
|---|---|---|---|---|
| 2,083,447 A | * | 6/1937 | Hoffmann | F04D 29/464 |
| | | | | 138/39 |
| 4,122,668 A | | 10/1978 | Chou et al. | |
| 4,893,225 A | * | 1/1990 | Solomon | F21V 9/40 |
| | | | | 362/293 |
| 5,523,815 A | * | 6/1996 | Tamura | G03B 9/02 |
| | | | | 359/228 |
| 5,534,961 A | * | 7/1996 | Dowe | G03B 9/22 |
| | | | | 396/500 |

(Continued)

FOREIGN PATENT DOCUMENTS

| | | |
|---|---|---|
| DE | 102008028298 A1 | 12/2009 |
| DE | 102010026176 A1 | 1/2012 |

(Continued)

*Primary Examiner* — Carlos A Rivera
*Assistant Examiner* — Theodore C Ribadeneyra
(74) *Attorney, Agent, or Firm* — John C. James (57) ABSTRACT

A centrifugal compressor for a turbocharger includes an inlet-adjustment mechanism operable to move between an open position and a closed position. The inlet-adjustment mechanism includes a plurality of blades disposed about the compressor air inlet and located within an annular space within the air inlet wall. The blades are pivotable about respective pivot points such that the blades extend radially inward from the annular space into the air inlet when the blades are in the closed position so as to form an orifice of reduced diameter relative to a nominal diameter of the inlet. Downstream surfaces of the blades include vortex reducers that are structured and arranged to reduce a strength of an unsteady vortex generated from the radially inner edges of the blades.

8 Claims, 8 Drawing Sheets

(56) References Cited

U.S. PATENT DOCUMENTS

| | | | | |
|---|---|---|---|---|
| 5,576,792 | A * | 11/1996 | O'Brien | G03B 9/02 355/71 |
| 5,724,625 | A * | 3/1998 | Dowe | G03B 9/22 396/497 |
| 6,375,155 | B1 * | 4/2002 | Janssens | F16L 55/10 251/212 |
| 6,666,237 | B2 * | 12/2003 | De Antoni Migliorati | B65B 39/005 141/286 |
| 7,819,728 | B2 * | 10/2010 | Beckley | B60H 1/3407 220/822 |
| 8,215,613 | B2 * | 7/2012 | Cheung | F16K 3/03 251/212 |
| 8,316,820 | B1 * | 11/2012 | Cammarata | F16K 3/03 123/336 |
| 8,430,140 | B2 * | 4/2013 | Ognjanovski | B60K 15/0406 141/350 |
| 8,910,920 | B1 * | 12/2014 | Daniels | F16K 3/03 123/188.1 |
| 9,175,786 | B2 * | 11/2015 | Luebbers | F16K 31/535 |
| 9,206,911 | B1 * | 12/2015 | Daniels | F16K 27/045 |
| 9,764,908 | B2 * | 9/2017 | Lin | B65G 53/40 |
| 9,821,966 | B2 * | 11/2017 | Lin | B65G 53/40 |
| 10,295,100 | B1 * | 5/2019 | Handley | F15D 1/025 |
| 10,299,642 | B2 * | 5/2019 | Buchanan | F04D 25/08 |
| 10,393,009 | B2 * | 8/2019 | Mohtar | |
| 2008/0192326 | A1 * | 8/2008 | Mizumaki | G02B 5/005 359/234 |
| 2009/0025416 | A1 * | 1/2009 | Murakami | F25B 41/04 62/324.6 |
| 2009/0095350 | A1 * | 4/2009 | Bauman | F16K 3/03 137/1 |
| 2009/0114861 | A1 * | 5/2009 | Luebbers | F16K 3/03 251/129.11 |
| 2012/0230817 | A1 * | 9/2012 | Iwata | F04D 29/462 415/206 |
| 2014/0308110 | A1 | 10/2014 | Houst et al. | |
| 2015/0041695 | A1 * | 2/2015 | Daniels | F16K 3/03 251/212 |
| 2017/0211707 | A1 * | 7/2017 | Wakayama | F02D 9/02 |
| 2017/0260987 | A1 * | 9/2017 | Onodera | F04D 27/0215 |
| 2017/0298953 | A1 * | 10/2017 | Lombard | F02B 37/00 |
| 2017/0342997 | A1 * | 11/2017 | Donaldson | F04D 27/0246 |
| 2017/0343002 | A1 * | 11/2017 | Ottow | F04D 29/162 |
| 2018/0163735 | A1 * | 6/2018 | Kim | F04D 27/002 |
| 2019/0048876 | A1 * | 2/2019 | Mohtar | F04D 29/464 |

FOREIGN PATENT DOCUMENTS

| | | |
|---|---|---|
| DE | 102011121996 B4 | 6/2013 |
| DE | 102012011423 B3 | 11/2013 |
| DE | 102013003418 A1 | 8/2014 |
| GB | 957884 A | 5/1964 |
| JP | 3719337 B2 | 9/2005 |
| WO | 2013074503 A1 | 5/2013 |
| WO | 2016041024 A2 | 3/2016 |

* cited by examiner

FIG. 9 ns­ # TURBOCHARGER COMPRESSOR HAVING ADJUSTABLE TRIM MECHANISM INCLUDING VORTEX REDUCERS

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically, the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

Applicant's co-pending U.S. patent application Ser. No. 15/446,054 filed on Mar. 1, 2017, which claims the benefit of the filing date of Provisional Application No. 62/324,488 filed on Apr. 20, 2016, the entire disclosures of said applications being hereby incorporated herein by reference, describes mechanisms and methods for a centrifugal compressor that can enable the surge line for the compressor to selectively be shifted to the left (i.e., surge is delayed to a lower flow rate at a given pressure ratio). One embodiment described in said applications comprises a turbocharger having the following features:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a volute for receiving compressed air discharged generally radially outwardly from the compressor wheel; and a compressor inlet-adjustment mechanism disposed in the air inlet of the compressor housing and pivotable radially inwardly and radially outwardly between an open position and a closed position, the inlet-adjustment mechanism comprising a plurality of blades disposed about the air inlet and each pivotable about one end of the blade, the blades pivoting radially inwardly through a slot in the air inlet wall when the blades are in the closed position so as to form an orifice of reduced diameter relative to a nominal diameter of the inlet.

Applicant is also the owner of additional applications directed to other inlet-adjustment mechanisms employing moving blades, including U.S. application Ser. No. 15/446, 090 filed on Mar. 1, 2017, the entire disclosure of which is hereby incorporated herein by reference.

The present disclosure concerns inlet-adjustment mechanisms generally of the type described in the aforementioned '054, '488, and '090 applications, and particularly concerns modifications or redesigns of such mechanisms that aim to improve upon certain aspects of said mechanisms.

BRIEF SUMMARY OF THE DISCLOSURE

One such aspect of the aforementioned inlet-adjustment mechanisms for which improvement is sought concerns noise generated by the compressor. It has been found that when the inlet-adjustment mechanism is in the closed position (reducing the effective inlet diameter leading into the compressor wheel), there is an increased level of noise generation by the compressor, the noise signature peaking at a particular frequency (for example, 4200 Hz). It has been found that the cause of this increased noise is a flow pulsation at that frequency. Further investigation via unsteady computational fluid mechanics analysis revealed that the flow pulsation is due to a region of flow separation at the orifice of the inlet-adjustment mechanism. The flow separation region appears to have some vortical motion, and hence this flow phenomenon is called a "vortex" in the present disclosure. This vortex is shed in what appears to be a random fashion from the orifice. The vortex emanates from the orifice and proceeds with an axial component of motion and also picks up some rotational component because of the influence of the rotating compressor wheel that is felt upstream of the wheel. As a result, the motion of the vortex is helical, and as the vortex impinges on the leading edge of the compressor wheel it moves (relatively) from one compressor blade, to the next, to the next, etc., because the vortex's rotational velocity is less than than of the wheel. The interaction between the vortex and the wheel causes the flow pulsation and noise that have been noted.

Accordingly, Applicant has sought to mitigate this noise issue.

In accordance with one embodiment disclosed herein, there is described a turbocharger having the following features:
- a turbine housing and a turbine wheel mounted in the turbine housing and connected to a rotatable shaft for rotation therewith, the turbine housing receiving exhaust gas and supplying the exhaust gas to the turbine wheel;
- a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a volute for receiving compressed air discharged generally radially outwardly from the compressor wheel, the air inlet wall defining an annular space surrounding the air inlet and open to the air inlet at a radially inner end of the annular space; and
- a compressor inlet-adjustment mechanism disposed in the annular space of the air inlet wall and movable between an open position and a closed position, the inlet-adjustment mechanism comprising a plurality of blades disposed within the annular space, the blades collectively circumscribing an orifice, each blade having an upstream surface relatively farther from and facing away from the compressor wheel and a downstream surface relatively closer to and facing toward the compressor wheel, the blades pivoting about respective pivots radially inwardly from the annular space into the air inlet when the blades are in the closed position so as to cause the orifice to have a reduced diameter relative to a nominal diameter of the inlet;
- wherein the downstream surface of each of the blades includes a plurality of circumferentially spaced vortex reducers that are structured and arranged to reduce a strength of a vortex shed from the orifice of the inlet-adjustment mechanism.

In one embodiment, the vortex reducers comprise cavities or depressions in the downstream surfaces of the blades. Separating walls disposed between adjacent cavities can be oriented radially or can be oriented non-radially. Alternatively, slots or channels (radial or non-radial) can be used as the vortex reducers. The vortex reducers are effective to reduce the strength of vortices shed from the inner edges of the blades, thereby reducing the noise caused by vortex-compressor wheel interaction.

The vortex reducers advantageously comprise a series of cavities or pockets formed in the downstream surface of each blade of the inlet-adjustment mechanism. The strength of the pulsation causing compressor noise to peak when the inlet-adjustment mechanism is closed can be reduced by suitable design of the pockets. More particularly, the number of pockets, the shapes of the pockets, and the angle of the walls between adjacent pockets with respect to the radial direction of the compressor are all design variables that the designer can select for tuning the vortex-reducing effect of the invention.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In the present disclosure, the term "orifice" means "opening" without regard to the shape of the opening. Thus, an "orifice" can be circular or non-circular. Additionally, when the blades of the inlet-adjustment mechanism are described as pivoting "radially" inwardly or outwardly, the term "radially" does not preclude some non-radial component of movement of the blades (for example, the blades may occupy a plane that is angled slightly with respect to the rotational axis of the compressor, such that when the blades pivot radially inwardly and outwardly, they also move with a small axial component of motion; alternatively, the blades may pivot and translate, such as in a helical type motion).

Figure 1:
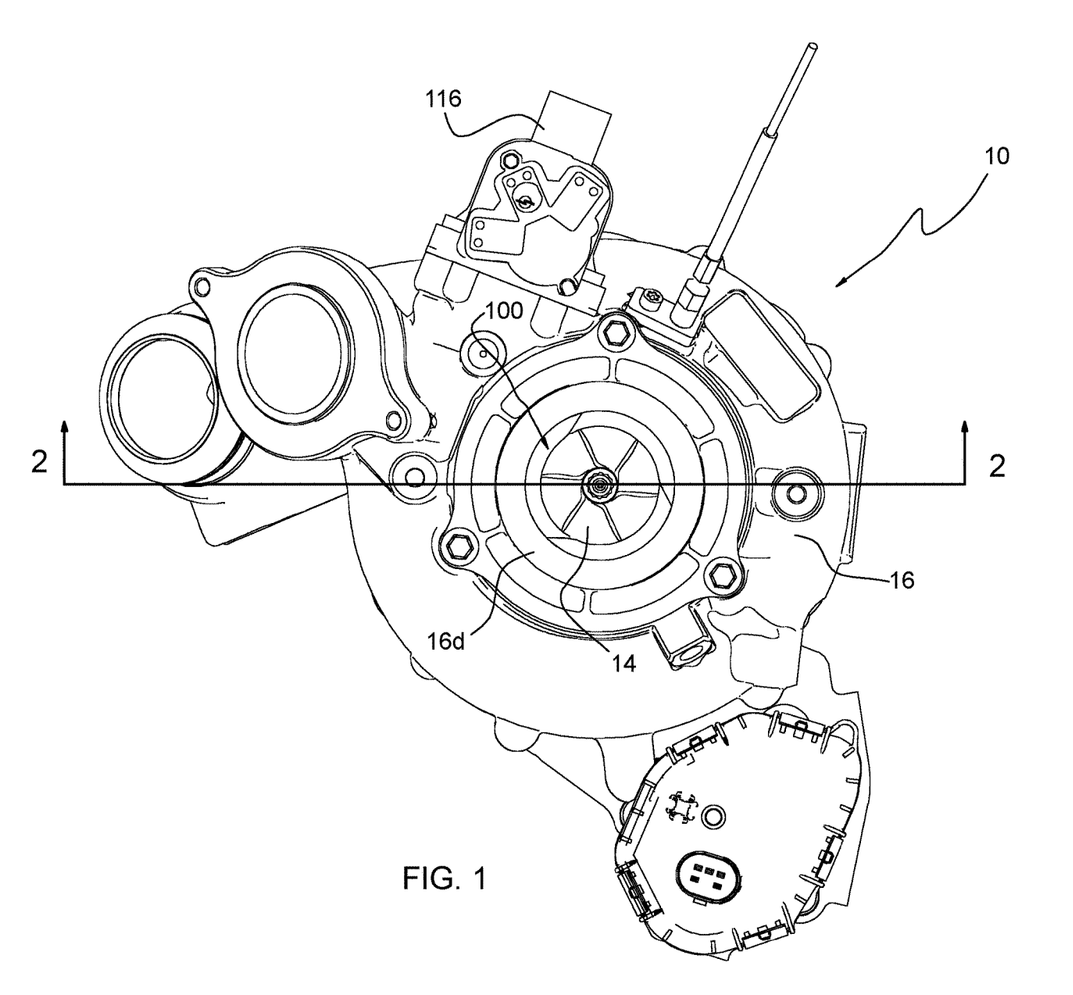
FIG. 1 is an end view of a turbocharger in accordance with one embodiment of the invention, looking axially from the compressor end toward the turbine end of the turbocharger.
Figure 2:
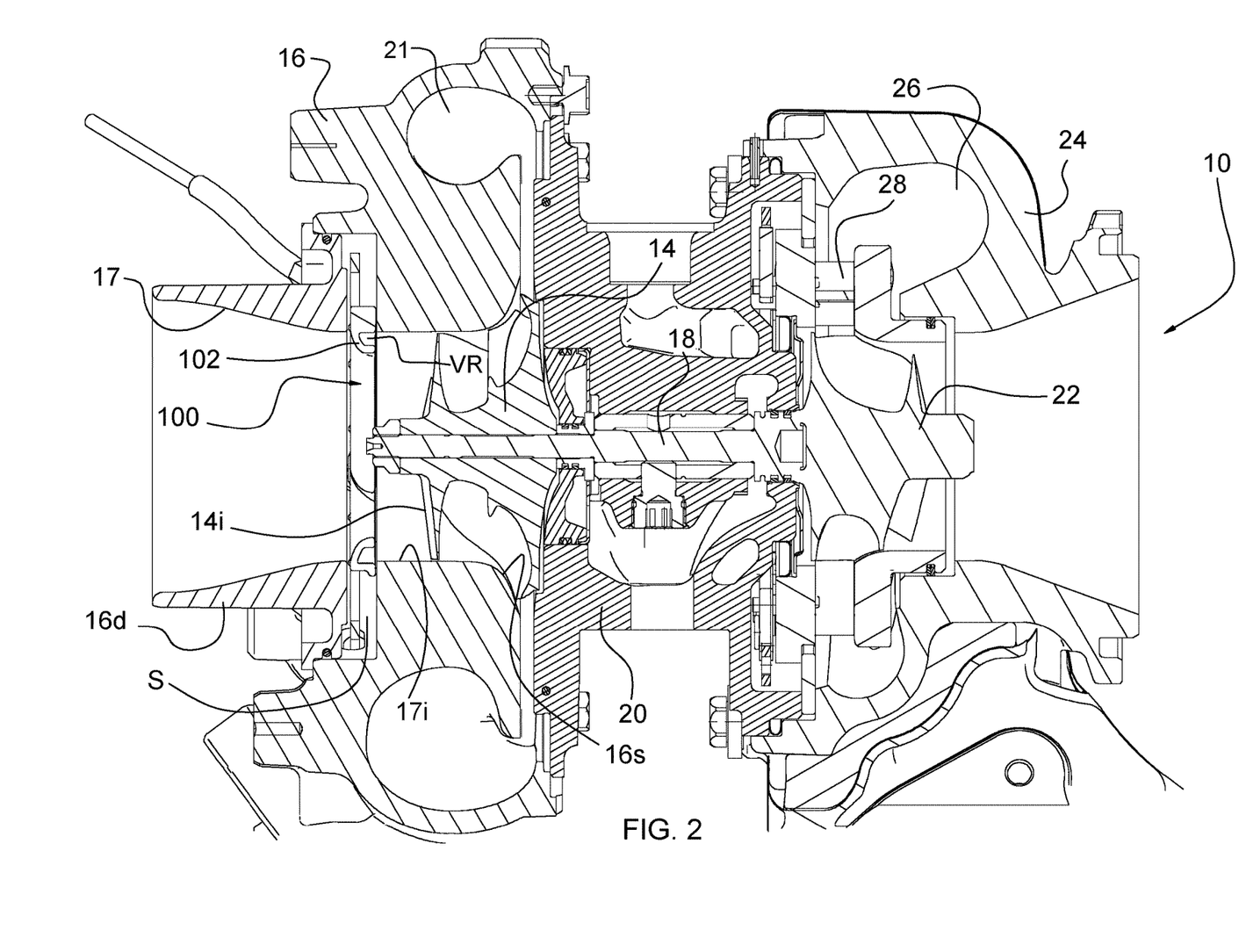
FIG. 2 is a cross-sectional view of the turbocharger along line 2-2 in FIG. 1.
Figure 3:
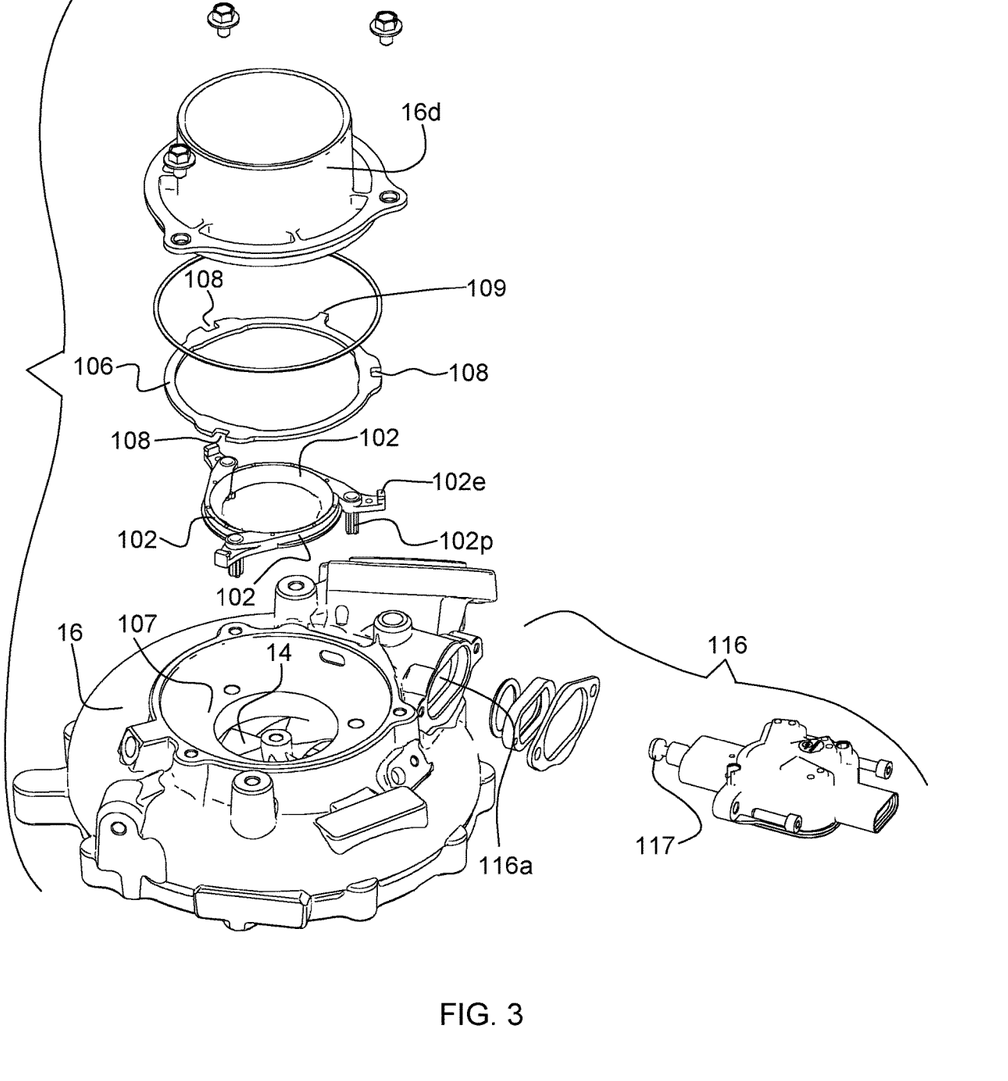
FIG. 3 is a partially exploded view of the compressor portion of the turbocharger of FIG. 1.

A turbocharger 10 in accordance with one embodiment of the invention is illustrated in axial end view in FIG. 1, and an axial cross-sectional view of the turbocharger is shown in FIG. 2. The turbocharger includes a compressor and a turbine. The compressor comprises a compressor wheel or impeller 14 mounted in a compressor housing 16 on one end of a rotatable shaft 18. The compressor housing includes a wall that defines an air inlet 17 for leading air generally axially into the compressor wheel 14. The shaft is supported in bearings mounted in a center housing 20 of the turbocharger. The shaft is rotated by a turbine wheel 22 mounted on the other end of the shaft from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The turbine wheel 22 is disposed within a turbine housing 24 that defines an annular chamber 26 for receiving exhaust gases from an internal combustion engine (not shown). The turbine housing also defines a nozzle 28 for directing exhaust gases from the chamber 26 generally radially inwardly to the turbine wheel 22. The exhaust gases are expanded as they pass through the turbine wheel, and rotatably drive the turbine wheel, which in turn rotatably drives the compressor wheel 14 as already noted.

With reference to FIGS. 1-4, in the illustrated embodiment, the wall that defines the air inlet 17 is formed in part by the compressor housing 16 and in part by a separate cover or inlet duct member 16d that is received into a cylindrical receptacle defined by the compressor housing. The portion of the air inlet 17 proximate the compressor wheel 14 defines a generally cylindrical inner surface 17i that has a diameter generally matched to the diameter of an inducer portion 14i of the compressor wheel.

The compressor housing 16 defines a shroud surface 16s that is closely adjacent to the radially outer tips of the compressor blades. The shroud surface defines a curved contour that is generally parallel to the contour of the compressor wheel.

In accordance with the invention, the compressor of the turbocharger includes an inlet-adjustment mechanism 100 disposed in the air inlet 17 of the compressor housing. The inlet-adjustment mechanism comprises a ring-shaped assembly and is disposed in an annular space defined between the compressor housing 16 and the separate inlet duct member 16d. The annular space is bounded between an upstream wall surface 105 and a downstream wall surface 107. The inlet-adjustment mechanism is operable for adjusting an effective diameter of the air inlet into the compressor wheel. As such, the inlet-adjustment mechanism is movable between an open position and a closed position, and can be configured to be adjusted to various points intermediate between said positions.

With reference now to FIGS. 3-8, the inlet-adjustment mechanism comprises a plurality of blades 102 arranged about the central axis of the air inlet and each pivotable about a pivot pin 102p located at or near one end of the blade. In the illustrated embodiment, the pivot pins for the blades are journaled in bores in the downstream wall surface 107 of the compressor housing, such that the pivot pins can rotate in said bores. In this embodiment, the pivot pins are integral with and rigidly attached to the blades. The blades are arranged between the upstream wall surface 105 and the downstream wall surface 107, with a small amount of axial clearance or play for the blades between those wall surfaces, so that the blades can freely pivot without binding.

The inlet-adjustment mechanism further comprises a unison ring 106 for imparting pivotal movement to the blades. The unison ring surrounds the assembly of the blades 102 and is substantially coplanar with the blades, and is rotatable about an axis that coincides with the rotation axis of the compressor wheel. The unison ring includes a plurality of recesses 108 in its radially outer periphery, and each blade includes an end portion 102e that is engaged in a respective one of the recesses 108. Accordingly, rotation of the unison ring in one direction causes the blades 102 to pivot radially inwardly, and rotation of the unison ring in the other direction causes the blades to pivot radially outwardly. The assembly of the blades 102 and unison ring 106 is captively retained between the upstream wall surface 105 and the downstream wall surface 107.

The radially inner edges of the blades 102 include portions that preferably are generally circular arc-shaped and these edges collectively surround and bound a generally circular opening or orifice (although the degree of roundness varies depending on the positions of the blades, as further described below).

Figure 5:
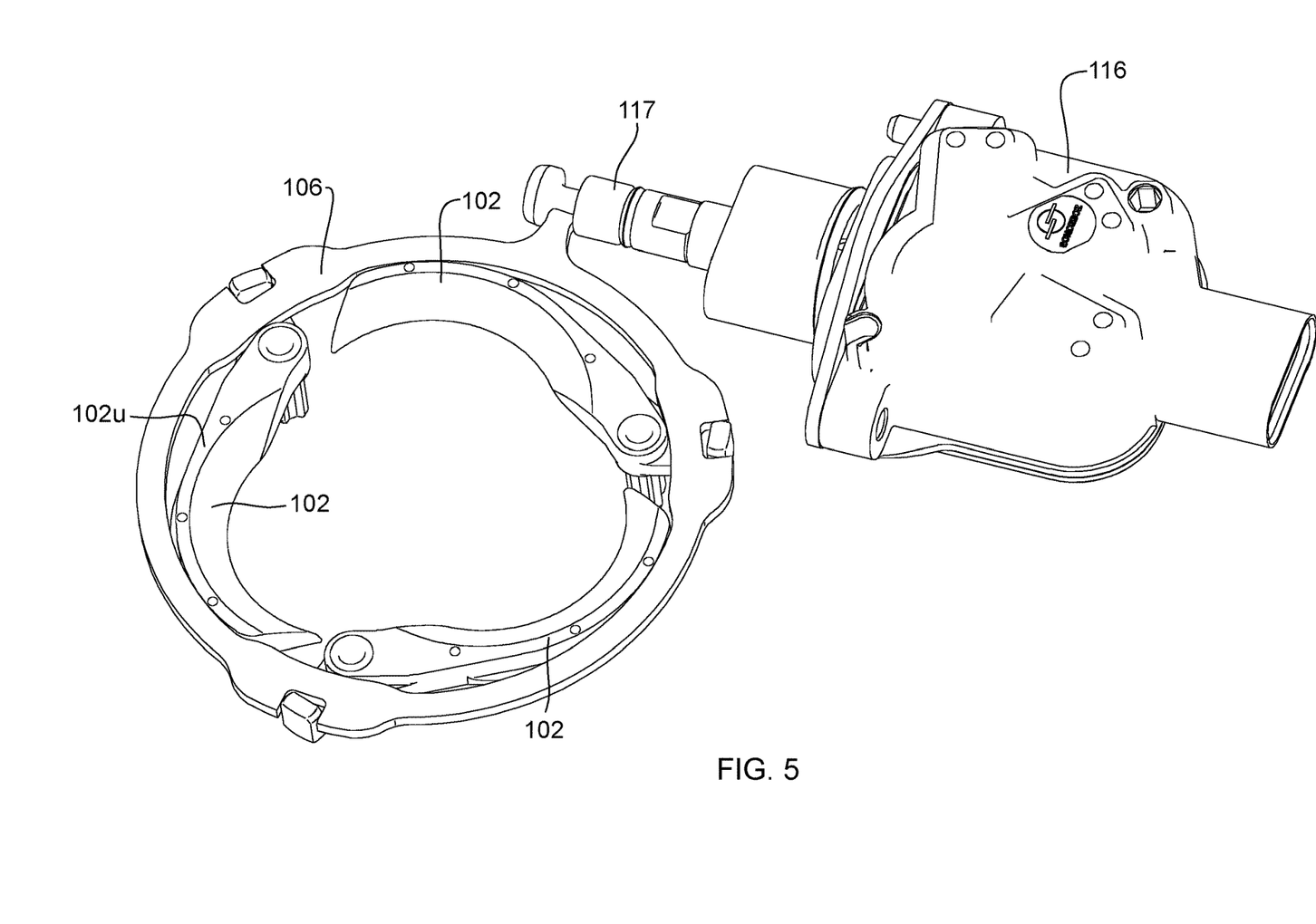
FIG. 5 is an isometric view of a partial assembly of the inlet-adjustment mechanism and the actuator therefore, with the inlet-adjustment mechanism in an open position, as viewed from the upstream side of the mechanism.

The range of pivotal movement of the blades is sufficient that the blades can be pivoted radially outwardly (by rotation of the unison ring in one direction, clockwise in FIG. 5) to an open position as shown in FIG. 5, in which the blades are entirely radially outward of the inner surface 17i (FIG. 2) of the inlet. As such, in the open position of the blades, the inlet-adjustment mechanism does not alter the nominal inlet diameter as defined by the inlet surface 17i.

Figure 6:
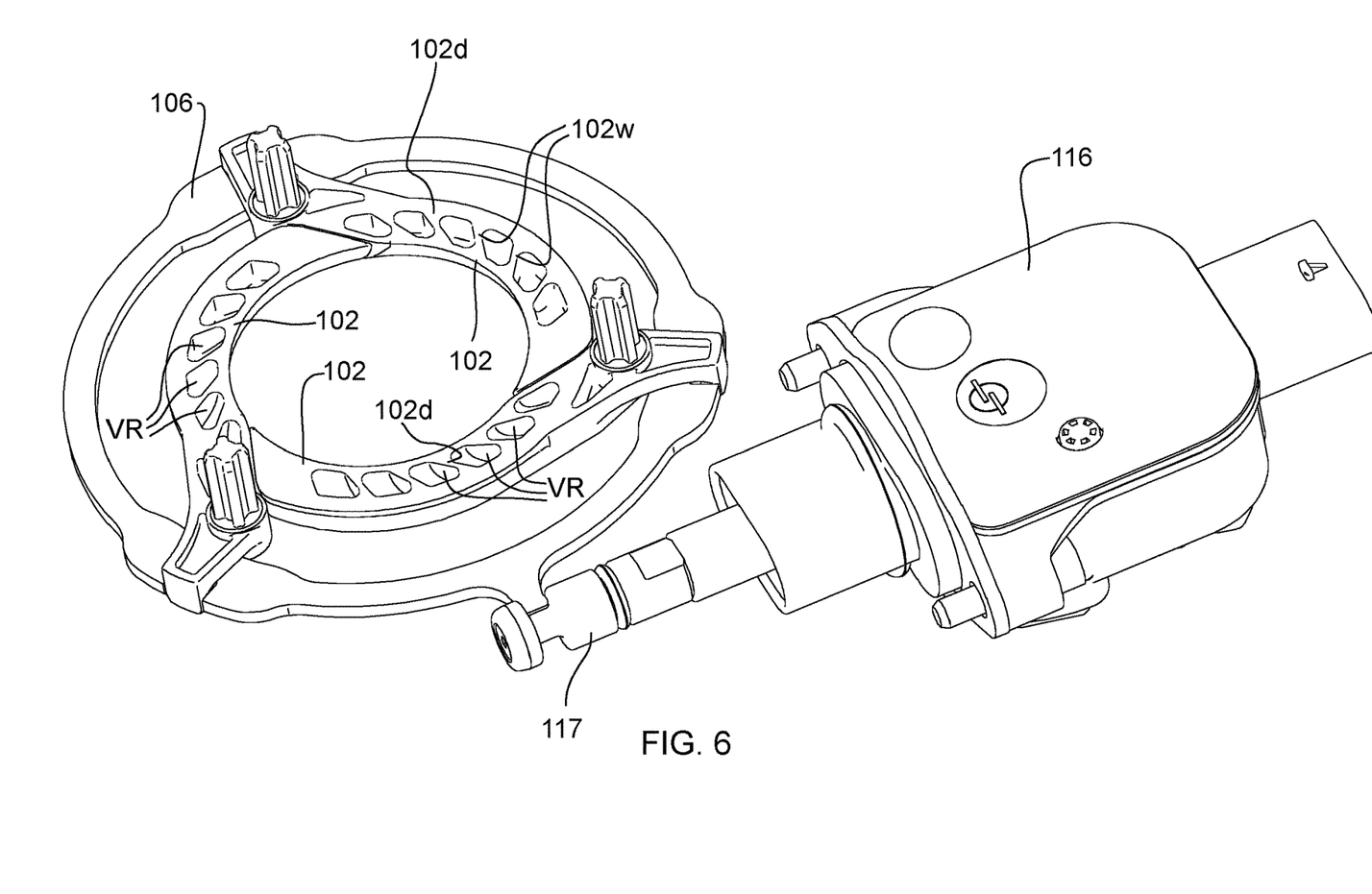
FIG. 6 is a view similar to FIG. 5, with the inlet-adjustment mechanism in a closed position, and viewed from the downstream side of the mechanism.
Figure 7:
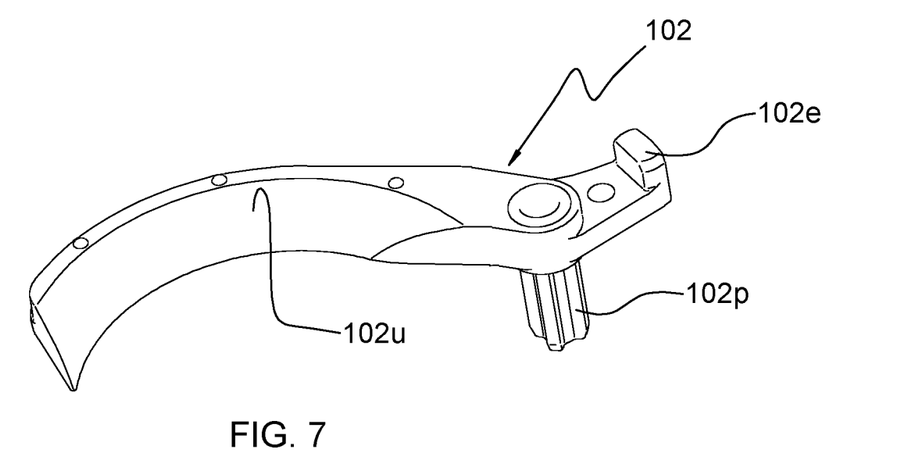
FIG. 7 is an isometric view of a blade of the inlet-adjustment mechanism, showing the upstream surface of the blade.

The blades can also be pivoted radially inwardly (by rotation of the unison ring in the opposite direction, counterclockwise in FIG. 5) to a closed position as shown in FIG. 6. In the closed position, the circular-arc edges along the radially inner sides of the blades collectively form an orifice. In the illustrated embodiment the orifice is substantially a circle in the closed position, having a diameter that is less than that of the inlet surface 17i. ("Substantially a circle" in the present disclosure means that the circular-arc edges all lie on the same circle and collectively occupy at least 80% of the circumference of that circle.) This has the consequence that the effective diameter of the inlet is reduced relative to the nominal inlet diameter. Furthermore, in a non-illustrated embodiment the blades can be pivoted an additional amount to a super-closed position in which there is some degree of overlap of adjacent blades, which is made possible by forming the respective overlapping edge portions of adjacent blades as complementing or male-female shapes. When the blades are in the super-closed position, the circular-arc edges of the blades collectively define an opening or orifice that is not perfectly circular but is effectively even smaller than the opening for the closed position of FIG. 6. Thus, the inlet-adjustment mechanism causes the effective diameter of the inlet to be further reduced relative to the closed position. In this manner, the inlet-adjustment mechanism is able to regulate the effective diameter of the air inlet approaching the compressor wheel.

It should be noted, however, that it is not essential that the orifice defined by the inlet-adjustment mechanism be circular in the closed position. Alternatively, the orifice can be non-circular. The invention is not limited to any particular shape of the orifice.

Figure 4:
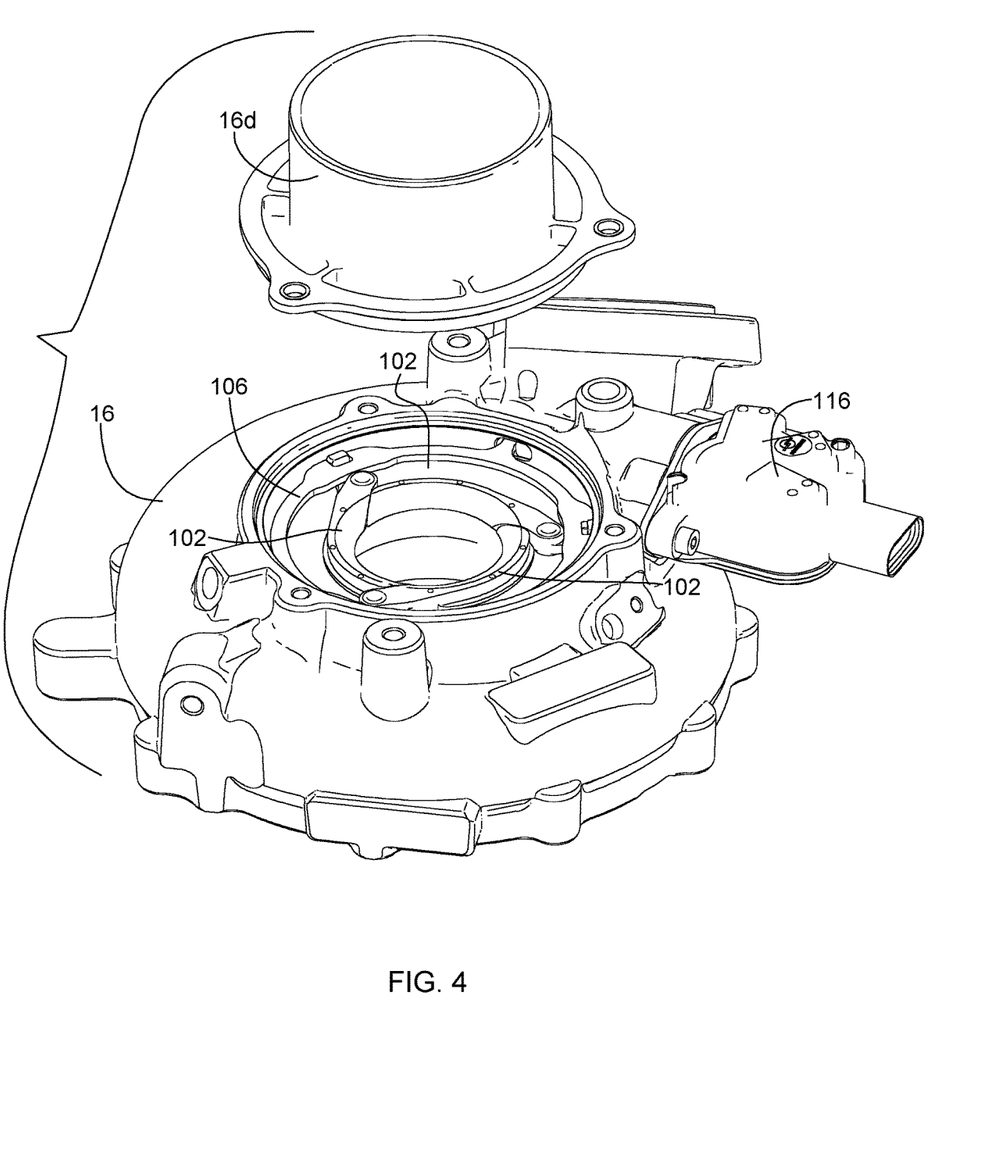
FIG. 4 an isometric view of the compressor housing assembly of FIG. 3, with the compressor cover (inlet duct member) exploded away so that the inlet-adjustment mechanism is visible.

As previously described, the blades 102 are actuated to pivot between their open and closed (and, optionally, super-closed) positions by the unison ring 106 that is rotatable about the center axis of the air inlet. Referring now to FIGS. 4-6, rotational motion is imparted to the unison ring by an actuator 116 that is received into a receptacle 116a (FIG. 3) defined in the compressor housing. The actuator includes an actuator rod 117 that extends through a space defined in the compressor housing and is affixed at its distal end to a protrusion 109 (FIG. 3) from the outer periphery of the unison ring 106. The actuator is operable to extend and retract the rod 117 linearly along its length direction so as to rotate the unison ring 106 and thereby actuate the blades 102. Extending the rod pivots the blades towards the closed position and retracting the rod pivots the blades toward the open position.

As noted, the inlet-adjustment mechanism 100 enables adjustment of the effective size or diameter of the inlet into the compressor wheel 14. As illustrated in FIG. 2, when the inlet-adjustment mechanism is in the closed position, the effective diameter of the inlet into the compressor wheel is dictated by the inside diameter defined by the blades 102. In order for this effect to be achieved, the axial spacing distance between the blades and the compressor wheel must be as small as practicable, so that there is insufficient distance downstream of the blades for the flow to expand to the full diameter of the inducer portion of the compressor wheel 14 by the time the air encounters it. The inlet diameter is thereby effectively reduced to a value that is dictated by the blades.

At low flow rates (e.g., low engine speeds), the inlet-adjustment mechanism 100 can be placed in the closed position of FIGS. 2 and 6. This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate).

At intermediate and high flow rates, the inlet-adjustment mechanism 100 can be partially opened or fully opened as in FIG. 5. This can have the effect of increasing the effective inlet diameter so that the compressor regains its high-flow performance and choke flow essentially as if the inlet-adjustment mechanism were not present and as if the compressor had a conventional inlet matched to the wheel diameter at the inducer portion of the wheel.

Figure 8:
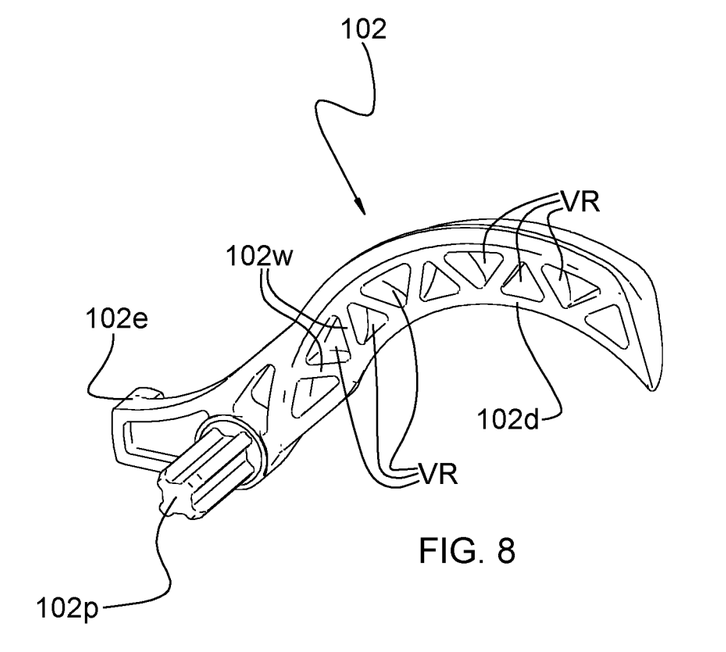
FIG. 8 is an isometric view of a blade, showing the downstream surface of the blade having vortex reducers in accordance with another embodiment of the invention.
Figure 9:
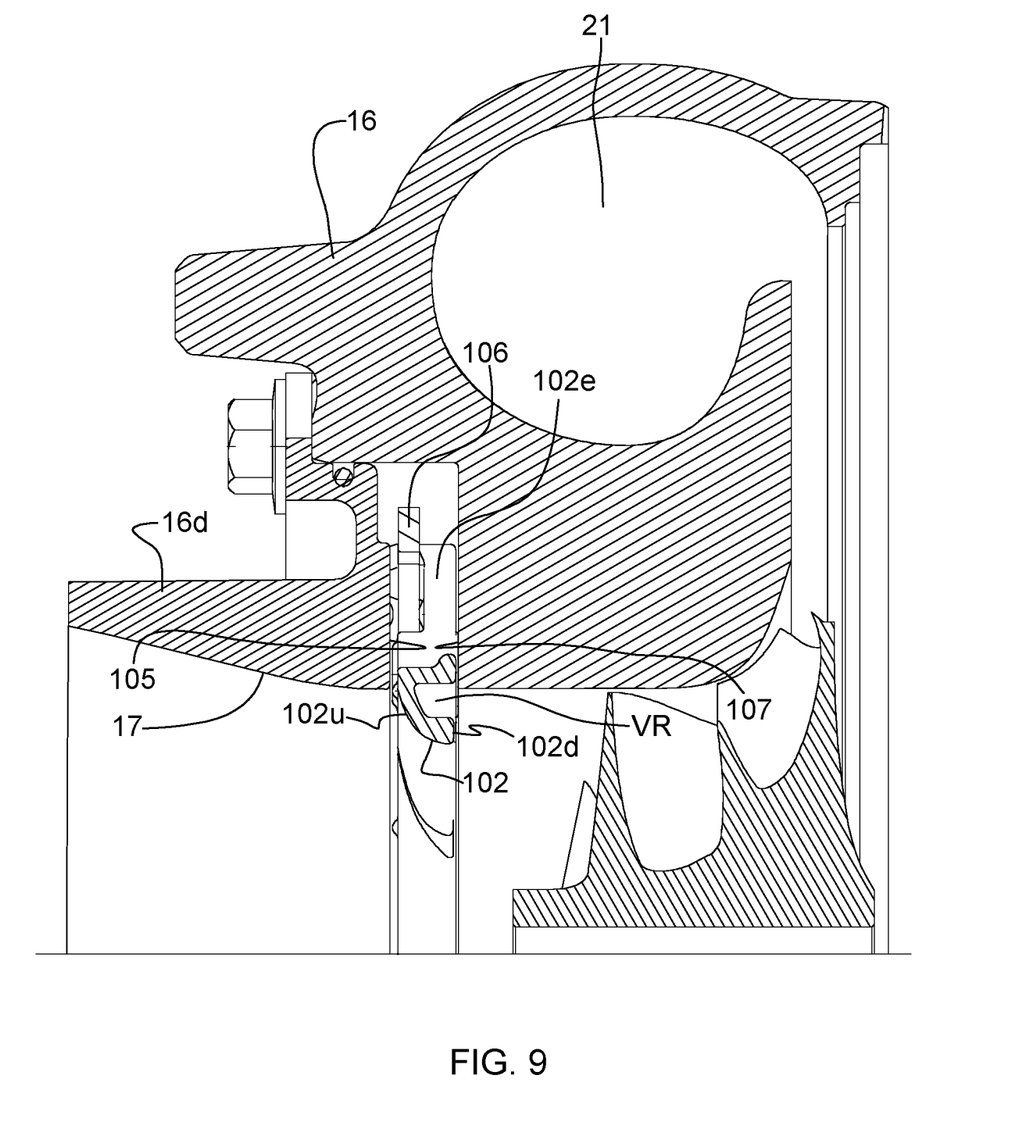
FIG. 9 is a cross-sectional view through the compressor housing assembly and inlet-adjustment mechanism of the turbocharger of FIG. 1.

In accordance with one aspect of the invention disclosed herein, the inlet-adjustment mechanism 100 includes features for reducing noise generated by interaction between the compressor wheel 14 and a vortex that is shed from the radially inner edges of the blades 102. This issue is particularly acute when the inlet-adjustment mechanism 100 is closed as in FIG. 2. With reference to FIGS. 6, 8, and 9, each blade 102 of the inlet-adjustment mechanism includes a plurality of circumferentially spaced (i.e., spaced apart along the length of the blade, which extends generally circumferentially) vortex reducers VR disposed in or on the downstream surface 102d of the blade. The vortex reducers can comprise a series of spaced pockets or cavities formed in the downstream surface of the blade, wherein there is a separating wall 102w disposed between each pair of adjacent cavities. The blades shown in FIG. 6 are in accordance with one embodiment of the invention, and the blade shown in FIG. 8 is in accordance with a further embodiment, differing in the shape of the pockets and the orientations of the walls 102w in between adjacent pockets. In the FIG. 6 embodiment, the pockets have a generally rectangular or trapezoidal shape, and the separating walls 102w are oriented non-radially, all having the same sign (i.e., either positive or negative). In the embodiment of FIG. 8, the pockets are generally triangular in shape, and the separating walls 102w are non-radial in orientation, the angles the walls make with the radial direction alternating between positive and negative (where an angle of zero denotes the radial direction).

The invention is not limited to vortex reducers comprising cavities as illustrated. Other structures on the downstream surfaces of the blades can also be effective in reducing the strength of the vortices shed from the blades. Such other structures can include slots or channels in the downstream surface. The slots or channels can extend radially or can extend at a non-zero angle with respect to radial.

Many modifications and other embodiments of the inventions set forth herein will come to mind to one skilled in the art to which these inventions pertain having the benefit of the teachings presented in the foregoing descriptions and the associated drawings. For example, although the illustrated embodiment employs three blades 102, the invention is not limited to any particular number of blades. The invention can be practiced with as few as two blades, or as many as 12 blades or more. The number of blades can be selected as desired. Moreover, while blades with circular-arc edges have been illustrated and described, the blades do not have to have circular-arc edges. Blades with edges of different shapes (linear, elliptical, etc.) are also included within the scope of the invention. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
a turbine housing and a turbine wheel mounted in the turbine housing and connected to a rotatable shaft for rotation therewith, the turbine housing receiving exhaust gas and supplying the exhaust gas to the turbine wheel;
a centrifugal compressor assembly comprising a compressor housing and a compressor wheel mounted in the compressor housing and connected to the rotatable shaft for rotation therewith, the compressor wheel having blades and defining an inducer portion, the compressor housing having an air inlet wall defining an air inlet for leading air generally axially into the compressor wheel, the compressor housing further defining a volute for receiving compressed air discharged generally radially outwardly from the compressor wheel, the air inlet wall defining an annular space surrounding the air inlet and open to the air inlet at a radially inner end of the annular space; and
a compressor inlet-adjustment mechanism disposed in the annular space of the air inlet wall and movable between an open position and a closed position, the inlet-adjustment mechanism comprising a plurality of blades disposed within the annular space, the blades collectively circumscribing an orifice, each blade having an upstream surface relatively farther from and facing away from the compressor wheel and a downstream surface relatively closer to and facing toward the compressor wheel, the blades pivoting about respective pivots radially inwardly from the annular space into the air inlet when the blades are in the closed position so as to cause the orifice to have a reduced diameter relative to a nominal diameter of the inlet;

wherein the downstream surface of each of the blades includes a plurality of circumferentially spaced vortex reducers that are structured and arranged to reduce a strength of a vortex shed from the orifice of the inlet-adjustment mechanism.

2. The turbocharger of claim 1, wherein the vortex reducers comprise cavities in the downstream surface of each blade.

3. The turbocharger of claim 2, wherein the vortex reducers comprise a series of cavities in the downstream surface of each blade, the cavities being spaced apart along a length of the blade.

4. The turbocharger of claim 3, wherein a separating wall is defined between each pair of adjacent cavities, the separating walls being oriented at a non-zero angle with respect to a radial direction of the compressor.

5. The turbocharger of claim 4, wherein the cavities are generally triangular shaped, and the separating walls between the cavities alternate between positive and negative angles with respect to the radial direction.

6. The turbocharger of claim 4, wherein the cavities are generally rectangular shaped, and the angles of the separating walls between the cavities all have the same sign.

7. The turbocharger of claim 1, wherein the inlet-adjustment mechanism further comprises a unison ring, the unison ring being rotatable about a rotational axis of the turbocharger, wherein each of the blades is engaged with the unison ring such that rotation of the unison ring causes the blades to pivot.

8. The turbocharger of claim 7, wherein each blade includes an end portion that engages an outer periphery of the unison ring.

* * * * *